US012785453B2

(12) United States Patent
Arai et al.

(10) Patent No.: US 12,785,453 B2
(45) Date of Patent: Nov. 3, 2026

(54) POWER RECEPTION APPARATUS, POWER RECEPTION METHOD, AND WIRELESS POWER FEED SYSTEM

(71) Applicant: KABUSHIKI KAISHA TOSHIBA, Tokyo (JP)

(72) Inventors: Kazuki Arai, Yokohama (JP); Toshiya Mitomo, Yokohama (JP); Yukako Tsutsumi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 19/287,146

(22) Filed: Jul. 31, 2025

(65) Prior Publication Data

US 2026/0081476 A1 Mar. 19, 2026

(30) Foreign Application Priority Data

Sep. 17, 2024 (JP) ................................ 2024-160213

(51) Int. Cl.
*H02J 50/27* (2016.01)
*H02J 50/23* (2016.01)
*H02J 50/80* (2016.01)

(52) U.S. Cl.
CPC .............. *H02J 50/27* (2016.02); *H02J 50/23* (2016.02); *H02J 50/80* (2016.02)

(58) Field of Classification Search
CPC ............. H02J 50/27; H02J 50/80; H02J 50/23
See application file for complete search history.

(56) References Cited

U.S. PATENT DOCUMENTS 9,209,519 B2 12/2015 Shinoda et al.
9,287,717 B2 3/2016 Amma et al.
(Continued)

FOREIGN PATENT DOCUMENTS

JP 3385472 B2 3/2003
JP 2008-199857 A 8/2008
(Continued)

OTHER PUBLICATIONS

Chen et al. "Design of A 5.8-Ghz Rectenna Incorporating A New Patch Antenna", IEEE Antennas and Wireless Propagation Letters, vol. 4, pp. 175-178, 2005.

*Primary Examiner* — Carlos Amaya
(74) *Attorney, Agent, or Firm* — Maier & Maier, PLLC

(57) ABSTRACT

A power reception apparatus includes: a power receiver to receive wireless power; a switching rectifier circuit including rectifiers with different power conversion characteristics and configured to rectify received power using a target rectifier selected from among them; a detector configured to detect output voltage or output power of the target rectifier; a power converter configured to control the output voltage of the target rectifier; a storage battery configured to be charged with or discharge output power of the power converter; and a controller configured to estimate the received power based on (i) the output voltage and information indicating a relationship between input power and output voltage of the target rectifier, or (ii) the output power and information indicating a relationship between input power and output power of the target rectifier. The controller further controls operations of the switching rectifier circuit and the power converter based on the estimated received power.

17 Claims, 10 Drawing Sheets

(56) References Cited

U.S. PATENT DOCUMENTS

| | | | |
|---|---|---|---|
| 10,447,053 B2 | 10/2019 | Tanaka et al. | |
| 11,070,093 B1 * | 7/2021 | Papadopoulos ....... | H02J 50/005 |

FOREIGN PATENT DOCUMENTS

| | | | |
|---|---|---|---|
| JP | 5419650 | B2 | 2/2014 |
| JP | 5621173 | B2 | 11/2014 |
| JP | 6152919 | B1 | 6/2017 |
| JP | 7382441 | B2 | 11/2023 |
| WO | 2023228753 | A1 | 11/2023 |

* cited by examiner

POWER RECEPTION APPARATUS, POWER RECEPTION METHOD, AND WIRELESS POWER FEED SYSTEM

CROSS REFERENCE TO RELATED APPLICATIONS

This application is based upon and claims the benefit of priority from the prior Japanese Patent Application No. 2024-160213, filed on Sep. 17, 2024, the entire contents of which are incorporated herein by reference.

FIELD

Embodiments described herein relate to a power reception apparatus, a power reception method, and a wireless power feed system.

BACKGROUND

A wireless power feed system that wirelessly transmits and receives feed power is known. The wireless power feed system is made up of a power transmission apparatus and a power reception apparatus. The power transmission apparatus wirelessly transmits feed power as a feeding beam (wireless power or RF power). The power reception apparatus receives the feeding beam as RF (radio frequency) power, converts the received power (hereinafter referred to as received RF power) into DC power, and outputs the DC power.

To convert received RF power into DC power, the power reception apparatus uses a rectifier. Power conversion efficiency of the rectifier changes depending on magnitude of input power, and the magnitude of the received RF power varies with radio wave environment. Thus, when a single rectifier is used, it is difficult to constantly obtain DC power with high efficiency from received RF power, the magnitude of which fluctuates widely.

To resolve such difficulty, it is conceivable to prepare a plurality of rectifiers differing from one another in power conversion characteristics and select, in each case, a rectifier that provides high-efficiency DC power, by switching among the plurality of rectifiers. However, it is inefficient to periodically switch among a plurality of rectifiers and compare output DC power among the rectifiers solely for the purpose of determining high-efficiency rectifiers because there occur periods in which non-high efficiency rectifiers are used.

DETAILED DESCRIPTION

Figure 1:
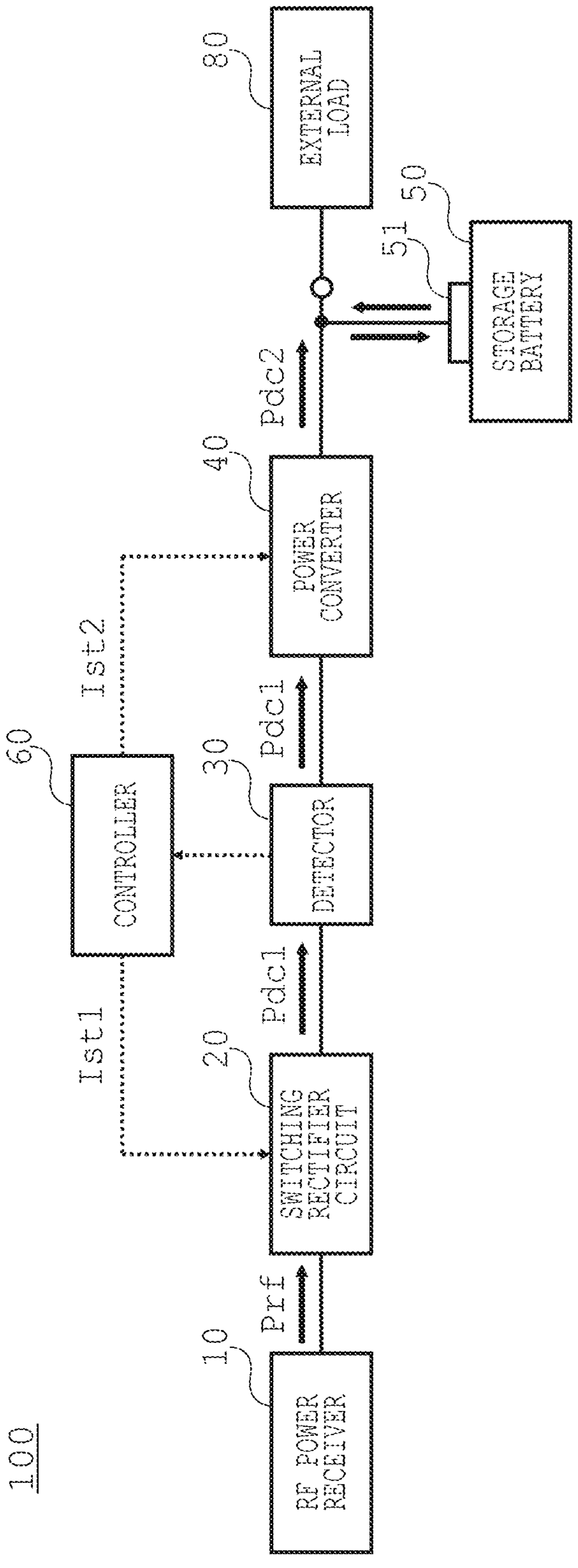
FIG. 1 is a diagram showing a configuration of a power reception apparatus according to Embodiment 1.

According to one embodiment, a power reception apparatus includes: a power receiver configured to receive wireless power; a switching rectifier circuit including a plurality of rectifiers having different power conversion characteristics and configured to rectify received power using a target rectifier selected from among the plurality of rectifiers; a detector configured to detect output voltage or output power of the target rectifier; a power converter configured to control the output voltage of the target rectifier; a storage battery configured to be charged with or discharge output power of the power converter; and a controller configured to estimate the received power based on (i) the output voltage of the target rectifier and information indicating a relationship between input power and the output voltage of the target rectifier, or (ii) the output power of the target rectifier and information indicating a relationship between the input power and the output power of the target rectifier, and control operations of the switching rectifier circuit and the power converter based on the estimated received power.

According to one embodiment, a wireless power reception method, includes: receiving wireless power; rectifying received power using a target rectifier selected from among a plurality of rectifiers differing in power conversion characteristics; detecting output voltage or output power of the target rectifier; estimating the received power based on (i) the output voltage of the target rectifier and information indicating a relationship between input power and the output voltage of the target rectifier or (ii) the output power of the target rectifier and information indicating a relationship between the input power and the output power of the target rectifier; and selecting the target rectifier based on the estimated received power.

According to one embodiment, a wireless power feed system includes: a power transmission apparatus configured to transmit wireless power; and a power reception apparatus configured to receive the wireless power, wherein the power reception apparatus includes: a power receiver configured to receive the wireless power, a switching rectifier circuit including a plurality of rectifiers differing in power conversion characteristics and configured to rectify received power using a target rectifier selected from among the plurality of rectifiers, a detector configured to detect output voltage or output power of the target rectifier, a power converter configured to control the output voltage of the target rectifier, a storage battery configured to be charged with or discharge output power of the power converter, and a first controller configured to estimate the received power based on (i) the output voltage of the target rectifier and information indicating a relationship between input power and the output voltage of the target rectifier or (ii) the output power of the target rectifier and on information indicating a relationship between the input power and the output power of the target rectifier, and to control operations of the switching rectifier circuit and the power converter based on the estimated received power.

Embodiments of the present invention will be described below with reference to the drawings. In the drawings, identical or corresponding elements are denoted by the same reference signs, and detailed description thereof will be omitted as appropriate.

Embodiment 1

(Configuration of Power Reception Apparatus)

FIG. 1 is a diagram showing a configuration of a power reception apparatus 100 according to Embodiment 1. The power reception apparatus 100 receives a feeding beam (wireless power) transmitted from a non-illustrated power transmission apparatus as RF power, converts the received power (hereinafter referred to as received RF power) into DC power, and supplies the DC power to an external load 80. The external load 80 is any electronic device or electronic apparatus operating on DC power.

The power reception apparatus 100 includes an RF power receiver 10 (power receiver), a switching rectifier circuit 20, a detector 30, a power converter 40, a storage battery 50, a charge level calculator 51 (calculator), and a controller 60 configured to control operations of the switching rectifier circuit 20 and power converter 40. The load, which is provided outside the power reception apparatus 100 as the external load 80, may be contained in the power reception apparatus 100.

The power receiver 10 receives the feeding beam transmitted from the power transmission apparatus, and outputs the received RF power as received RF power Prf. The switching rectifier circuit 20 includes a plurality of rectifiers differing in power conversion characteristics. Using one rectifier (target rectifier) selected by the controller 60 from the plurality of rectifiers, the switching rectifier circuit 20 rectifies received RF power Prf and outputs the resulting power as DC power Pdc1.

Figure 2:
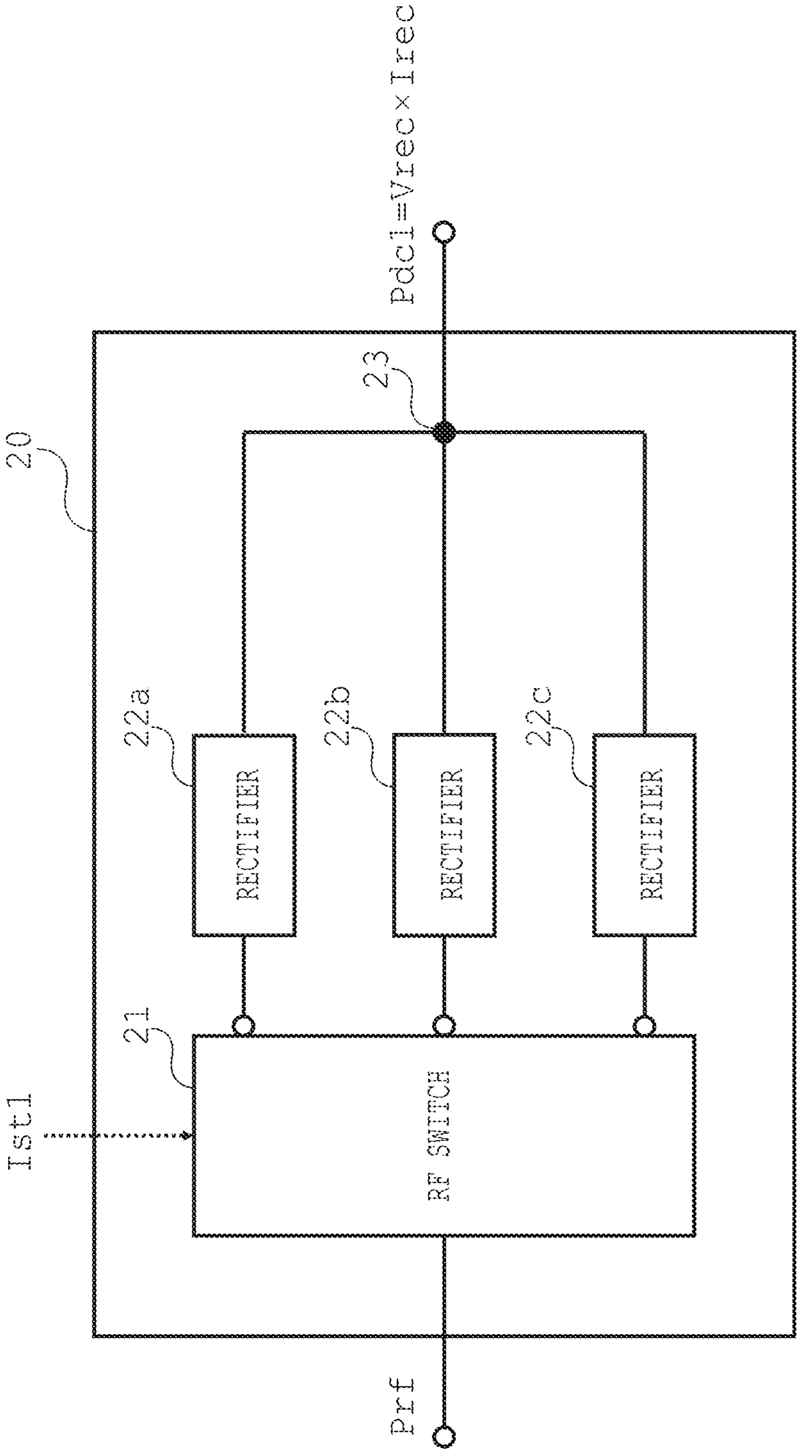
FIG. 2 is a diagram showing a detailed configuration of a switching rectifier circuit according to Embodiment 1.

FIG. 2 is a diagram showing a detailed configuration of the switching rectifier circuit 20. The switching rectifier circuit 20 includes an RF switch 21 (first switch) that operates by following a command signal Ist1 from the controller 60 and three rectifiers 22*a* to 22*c* differing in power conversion characteristics. However, the number of rectifiers is not limited to three, and it is sufficient if there are two or more rectifiers.

The RF switch 21 connects input of the switching rectifier circuit 20 with input of any one target rectifier selected by the controller 60. Outputs from the respective rectifiers 22*a* to 22*c* are connected together at a node 23 (first combiner) to form a single output of the switching rectifier circuit 20. Consequently, the received RF power Prf inputted to the switching rectifier circuit 20 is rectified by the target rectifier selected by the controller 60 and outputted as DC power Pdc1 (=Vrec×Irec) from the switching rectifier circuit 20, where Vrec is an output voltage of the target rectifier and Irec is an output current of the target rectifier.

The detector 30 includes a DC voltage sensor and a DC current sensor. The detector 30 detects the output voltage Vrec and the output current Irec of the target rectifier, multiplies values of the output voltage Vrec and the output current Irec by each other, and thereby calculates the output power Pdc1. The detector 30 transmits information indicating the output power Pdc1, the output voltage Vrec, and the output current Irec of the target rectifier to the controller 60.

The power converter 40 includes a DC-DC converter circuit configured to operate by following a command signal Ist2 from the controller 60. The power converter 40 converts the DC power Pdc1 outputted by the switching rectifier circuit 20 into DC power Pdc2 and outputs the DC power Pdc2. Output from the power converter 40 is connected with the storage battery 50. Consequently, an output voltage of the power converter 40 is fixed to a closed-circuit voltage (CCV) of the storage battery 50, which depends on the charge level of the storage battery 50. On the other hand, input to the power converter 40 is output from the switching rectifier circuit 20. A maximum value of the output voltage depends on the received RF power Prf, and the actual output voltage is found uniquely when output load conditions of the switching rectifier circuit 20 are determined as well. Thus, an output voltage of the DC-DC converter circuit is fixed and an input voltage is changeable. The DC-DC converter circuit performs the operation of producing output by stepping up or down the voltage depending on a voltage difference between input and output, i.e., step-up/step-down operation, and what is changed during operation in this state is the input voltage as described above. Using this property, by controlling the step-up/step-down operation of the power converter 40, the controller 60 controls the output voltage Vrec of the target rectifier included in the switching rectifier circuit 20.

The storage battery 50 is made up of a secondary battery, a capacitor, or the like and is charged with and discharges the DC power Pdc2 outputted from the power converter 40. Specifically, when the DC power Pdc2 outputted from the power converter 40 is higher than the power required by the external load 80, the storage battery 50 is charged with the power corresponding to the surplus. On the other hand, when the DC power Pdc2 outputted from the power converter 40 is lower than the power required by the external load 80, the power corresponding to the deficit is discharged from the storage battery 50. The charge level calculator 51 measures the electric power involved in charging and discharging of the storage battery 50 and calculates the charge level of the storage battery 50 (the amount of electrical charge stored in the storage battery 50) based on the measurement results. The controller 60 may perform such control as to stop the power converter 40 when full charge is approached and resume charging when the charge level falls to a predetermined value. Alternatively, the controller 60 may perform such control as to open the RF switch 21 of the switching rectifier circuit 20 when full charge is approached and close the RF switch 21 when the charge level falls to the predetermined value. Alternatively, when communication from the power reception apparatus to the power transmission apparatus is possible, the controller 60 may perform such control as to transmit a stop power transmission request to the power transmission apparatus when full charge is approached and transmit a resume power transmission request when the charge level falls to the predetermined value.

The controller 60 is made up of a microcomputer, an FPGA (field programable gate array), an ASIC (application specific integrated circuit), or the like. The controller 60 estimates the current received RF power Prf based on information transmitted from the detector 30, indicating the output voltage Vrec or the output power Pdc1 of the currently selected target rectifier as well as on the power conversion characteristics of the target rectifier. Based on the current received RF power Prf, the controller 60 selects any one of the rectifiers 22*a* to 22*c* included in the switching rectifier circuit 20 as a target rectifier. Using the power converter 40, the controller 60 controls the output voltage Vrec of the target rectifier such that the output power Pdc1 of the target rectifier will be maximized.

(Power Conversion Characteristics of Rectifiers)

Now, power conversion characteristics of rectifiers will be described. Generally the power conversion efficiency of a rectifier depends on the RF power (input RF power Pin) inputted to the rectifier and a load (output load RL) connected to the rectifier output.

Figure 3:
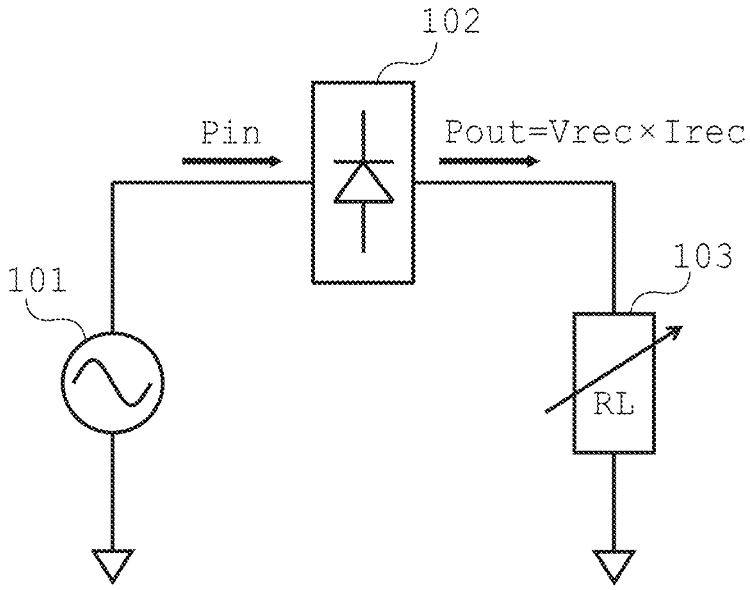
FIG. 3 is a diagram showing an evaluation system configured to evaluate power conversion characteristics of rectifiers.

FIG. 3 is a diagram showing an evaluation system configured to evaluate power conversion characteristics of rectifiers. The evaluation system is made up of an RF power supply 101, a rectifier 102, and variable resistance 103. The RF power supply 101 supplies the input RF power Pin to the rectifier 102. The input RF power Pin corresponds to the received RF power Prf of the power reception apparatus 100 in FIG. 1.

The rectifier 102 rectifies the input RF power Pin and outputs the resulting power as output DC power Pout (=Vrec×Irec). The rectifier 102 corresponds to the rectifiers 22*a* to 22*c* included in the switching rectifier circuit 20 in FIG. 2. The output DC power Pout corresponds to the output power Pdc1 of the target rectifier selected from among the rectifiers 22*a* to 22*c*. The variable resistance 103 is the output load RL of the target rectifier 102 and corresponds to the power converter 40, storage battery 50, and external load 80 of the power reception apparatus 100 in FIG. 1. In the evaluation system of FIG. 3, the power conversion efficiency of the rectifier 102 depends on the input RF power Pin and the output load RL.

Figure 4:
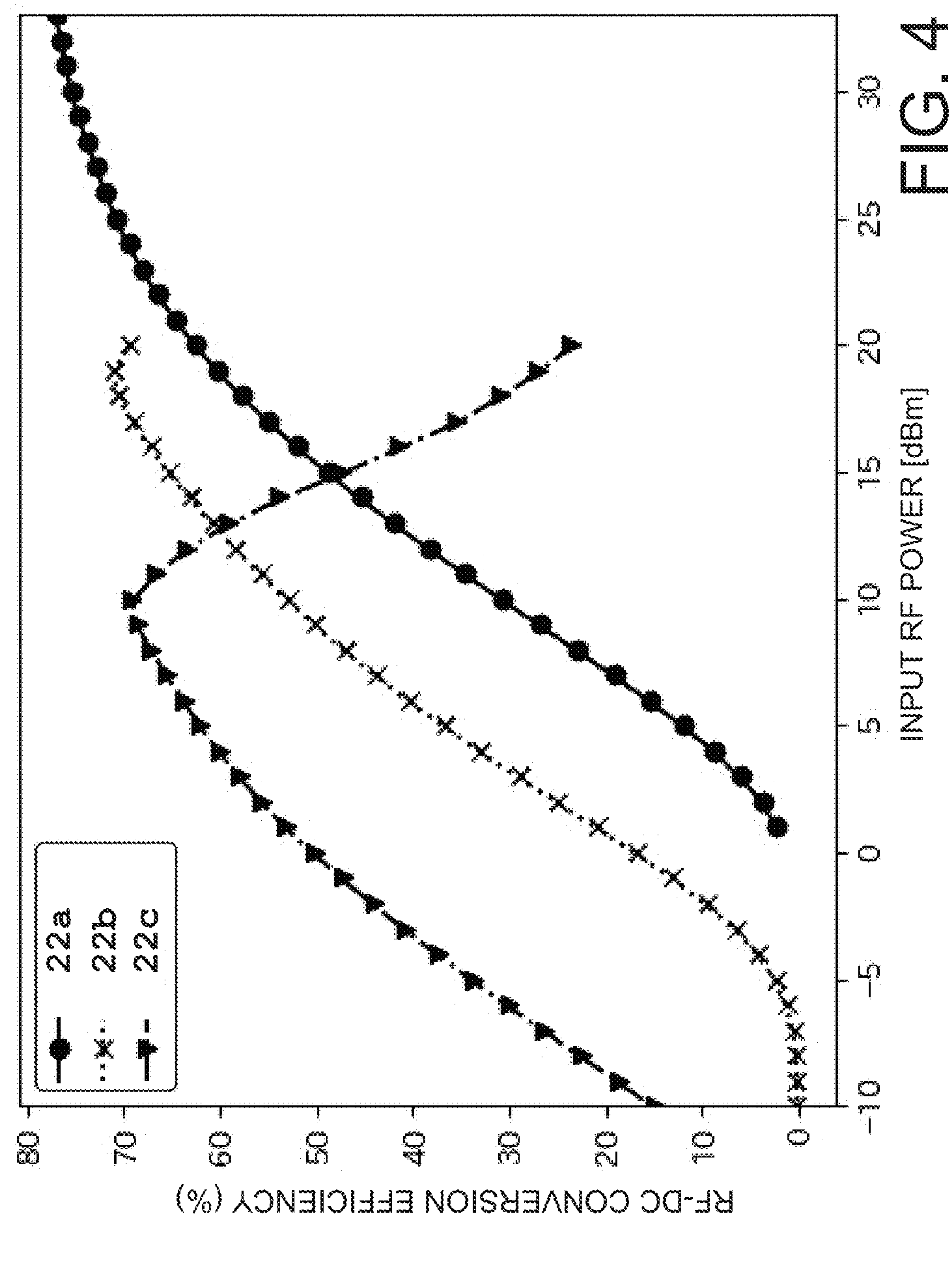
FIG. 4 is a diagram showing power conversion characteristics of rectifiers.

First, as a first parameter that determines the power conversion efficiency of the rectifier, let us focus on the input RF power Pin. FIG. 4 shows simulation results regarding the three rectifiers 22*a* to 22*c* included in the switching rectifier circuit 20, produced by plotting a relationship between the input RF power Pin and power conversion efficiency using the evaluation system of FIG. 3. The plot points have been arranged by adjusting the output load RL to maximize output RF power Pout with respect to the input RF power Pin on the abscissa.

As shown in FIG. 4, when power conversion characteristics vary from rectifier to rectifier, if an appropriate rectifier is selected as a target rectifier according to the input RF power Pin, high power conversion efficiency can be obtained for a wide range of input RF power Pin. However, although the power conversion efficiency of the rectifiers monotonously increases with increases in the input RF power Pin at first, the power conversion efficiency takes a downward turn upon reaching a particular input RF power value. The region in which the power conversion efficiency decreases is a region in which the output voltage Vrec of the rectifiers is in excess of a maximum voltage (maximum output voltage) that can be outputted stably, and in which the rectifiers could get damaged. Therefore, in order for the rectifiers to operate stably, it is necessary that the output voltage Vrec of the rectifiers does not exceed the maximum output voltage. This corresponds to the condition that the input RF power Pin inputted to the rectifiers is not higher than a maximum power (maximum input power) that can be inputted to the rectifiers.

According to Embodiment 1, the controller 60 estimates the current received RF power Prf (the input RF power Pin) by a method described later. Then, as a target rectifier, the controller 60 selects the rectifier, the maximum input power of which is equal to or higher than the current received RF power Prf, and which provides the highest power conversion efficiency at the current received RF power Prf, from among the rectifiers 22*a* to 22*c* included in the switching rectifier circuit 20. For example, when the received RF power Prf=5 dBm, the rectifier 22*c* is selected. When the received RF power Prf=25 dBm, the rectifier 22*a* is selected. By selecting an appropriate rectifier as a target rectifier according to the current received RF power Prf, high power conversion efficiency can be obtained over a wide range of received RF power Prf.

Figure 5:
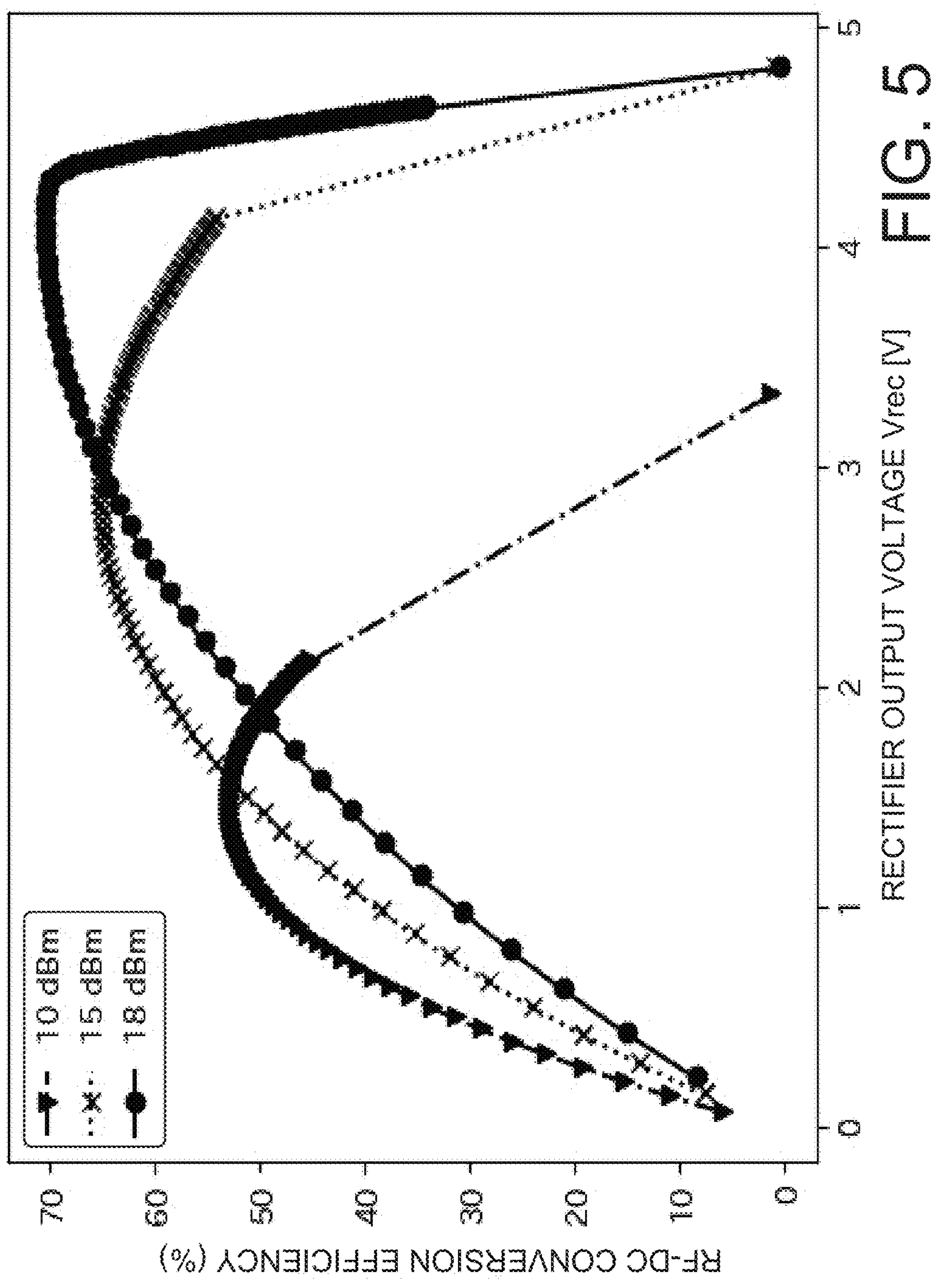
FIG. 5 is a diagram showing power conversion characteristics of rectifiers.

Next, as a second parameter that determines the power conversion efficiency of the rectifier, let us focus on the output load RL. As described above, in the evaluation system of FIG. 3, the variable resistance 103 is the output load RL. FIG. 5 shows simulation results regarding the rectifier 22*b* included in the switching rectifier circuit 20, produced by plotting a relationship between the output load RL and the power conversion efficiency using the evaluation system of FIG. 3 by varying the output load RL with the input RF power Pin being fixed to each of constant values of 10 dBm, 15 dBm, and 18 dBm. However, the abscissa in FIG. 3 is represented here by the output voltage Vrec, which uniquely corresponds to the output load RL. The correspondence between the output load RL and the output voltage Vrec is such that when the output load RL is infinite (open), the output voltage Vrec takes a maximum value, and when the output load RL approaches zero (short circuit), the output voltage Vrec approaches a minimum value (zero).

As shown in FIG. 5, when the input RF power Pin is fixed to constant values, the power conversion efficiency, i.e., output power Pout, of the rectifier can be maximized by adjusting the output load RL (output voltage Vrec). According to Embodiment 1, using the power converter 40, the controller 60 controls the output voltage Vrec of the currently selected target rectifier included in the switching rectifier circuit 20, and thereby maximizes the output power Pdc1 of the target rectifier.

For example, when the target rectifier is the rectifier 22*b* and the current received RF power Prf=15 dBm, based on the power conversion characteristics of the rectifier 22*b* in FIG. 5 and using the power converter 40, the controller 60 performs control such that the output voltage Vrec of the rectifier 22*b* will be around 2.8 V. In this way, by controlling the output voltage Vrec of the target rectifier at the given received RF power Prf, it is possible to maximize the output power Pdc1 of the target rectifier.

(Operation of Power Reception Apparatus)

Operation of the power reception apparatus 100 according to Embodiment 1 is outlined as follows:

First, the controller 60 estimates the current received RF power Prf and selects an appropriate rectifier as a target rectifier according to the current received RF power Prf. Next, the controller 60 controls the output voltage Vrec of the target rectifier using the power converter 40, and thereby maximizes the output power Pdc1 of the target rectifier. When a predetermined condition such as the condition that the received RF power Prf fluctuates is satisfied, the controller 60 starts over again beginning with estimation of the current received RF power Prf.

Figure 6:
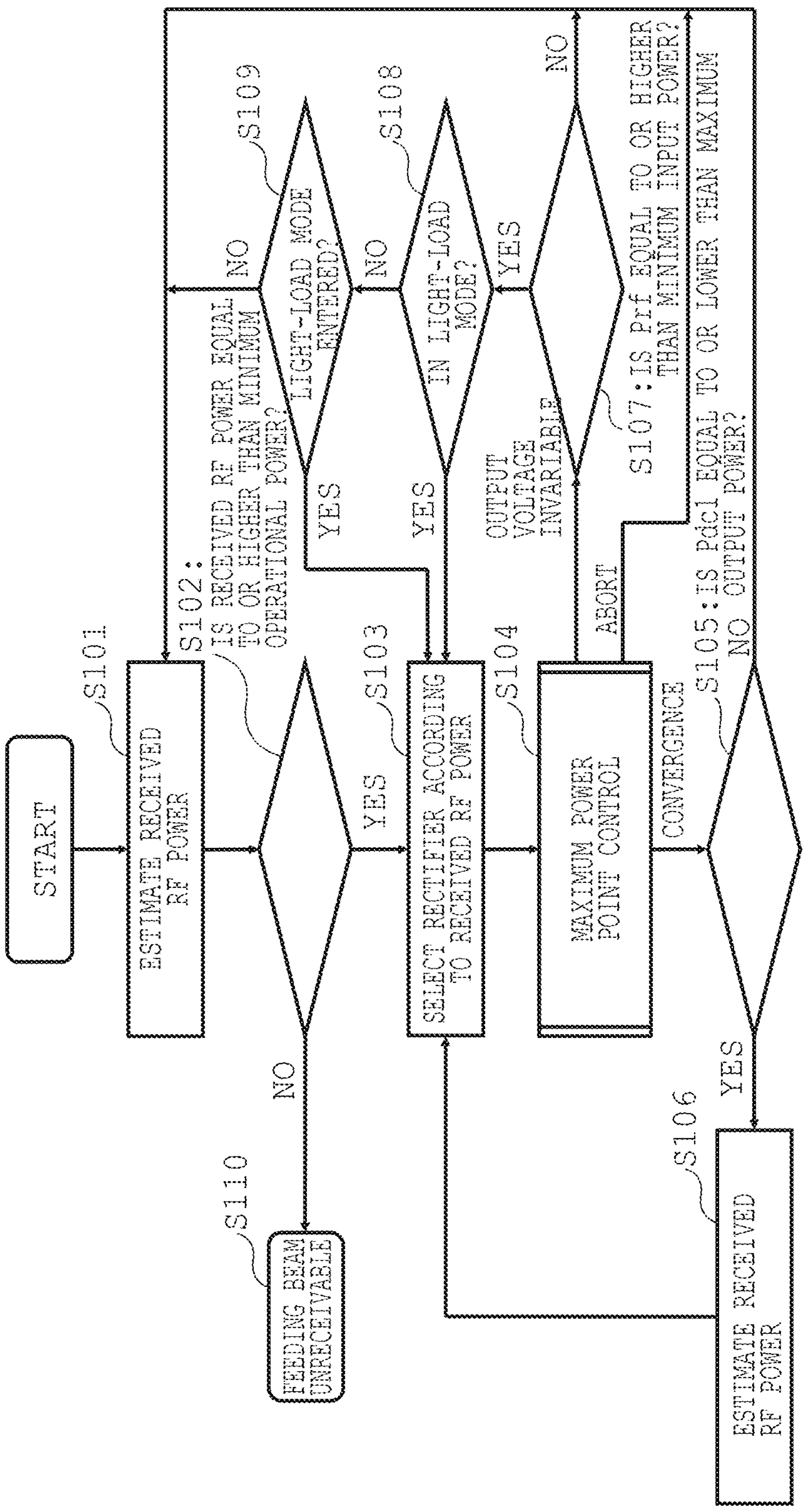
FIG. 6 is a flowchart explaining detailed operation of the power reception apparatus.

FIG. 6 is a flowchart explaining detailed operation of the power reception apparatus 100 according to Embodiment 1.

In step S101, the controller 60 estimates the current received RF power Prf. Specifically, to acquire the output voltage Vrec as accurately as possible while keeping the rectifiers from getting damaged, with an input current of the power converter 40 fixed to 0, i.e., with input impedance fixed to infinity (open state), the controller 60 selects the rectifiers 22*a* to 22*c* included in the switching rectifier circuit 20 in descending order of maximum input power, and identifies the rectifier, of which output voltage Vrec in open state is not higher than the maximum output voltage in open state (open-state maximum output voltage) and differs the least from the open-state maximum output voltage of the target rectifier, i.e., identifies the rectifier that can acquire the output voltage Vrec with the highest accuracy. Then, the controller 60 acquires the output voltage Vrec in open state using the identified rectifier. Regarding a specific method for making the input impedance of the power converter 40 infinite (open), for example, in a typical switching regulator circuit used as a DC-DC converter, no input current flows in a stopped state of switching operation, leaving the input side in open-circuit condition, and thus the output voltage Vrec of the rectifier in open state can be acquired under this condition. The controller 60 estimates the current received RF power Prf from the output voltage Vrec in open-state acquired with the highest accuracy using a relationship between input power and output voltage when rectifier output is open.

In step S102, the controller 60 determines whether the current received RF power Prf is equal to or higher than minimum power at which the power reception apparatus 100 can operate. If the current received RF power Prf is equal to or higher than the minimum power at which the power reception apparatus 100 can operate (Yes in S102), the controller 60 goes to the processes of step S103 and subsequent steps. On the other hand, if the current received RF power Prf is lower than the minimum power at which the power reception apparatus 100 can operate (No in S102), the controller 60 determines that the feeding beam is unreceivable (S110).

In step S103, based on the current received RF power Prf, the controller 60 selects any one of the rectifiers 22*a* to 22*c* included in the switching rectifier circuit 20, as a target rectifier. Specifically, from among the rectifiers 22*a* to 22*c*, the controller 60 selects the rectifier, the maximum input power of which is equal to or higher than the current received RF power Prf, and which provides the highest power conversion efficiency at the current received RF power Prf, as a target rectifier. For example, if the current received RF power Prf=15 dBm, based on the power conversion characteristics of each of the rectifiers in FIG. 4, the controller 60 selects the rectifier 22*b* as a target rectifier.

In step S104, the controller 60 performs maximum power point control using the currently selected target rectifier. The maximum power point is the output voltage Vrec that maximizes the output power Pdc1 of the rectifier at given received RF power Prf. The controller 60 controls the output voltage Vrec such that the output voltage Vrec of the target rectifier will be located at the maximum power point, i.e., the output power Pdc1 of the target rectifier will be maximized. For example, if the target rectifier is the rectifier 22*b*, and the current received RF power Prf=15 dBm, based on the power conversion characteristics of the rectifier 22*b* in FIG. 5, the output voltage Vrec of the rectifier 22*b* is controlled to be around 2.8 V.

Figure 7:
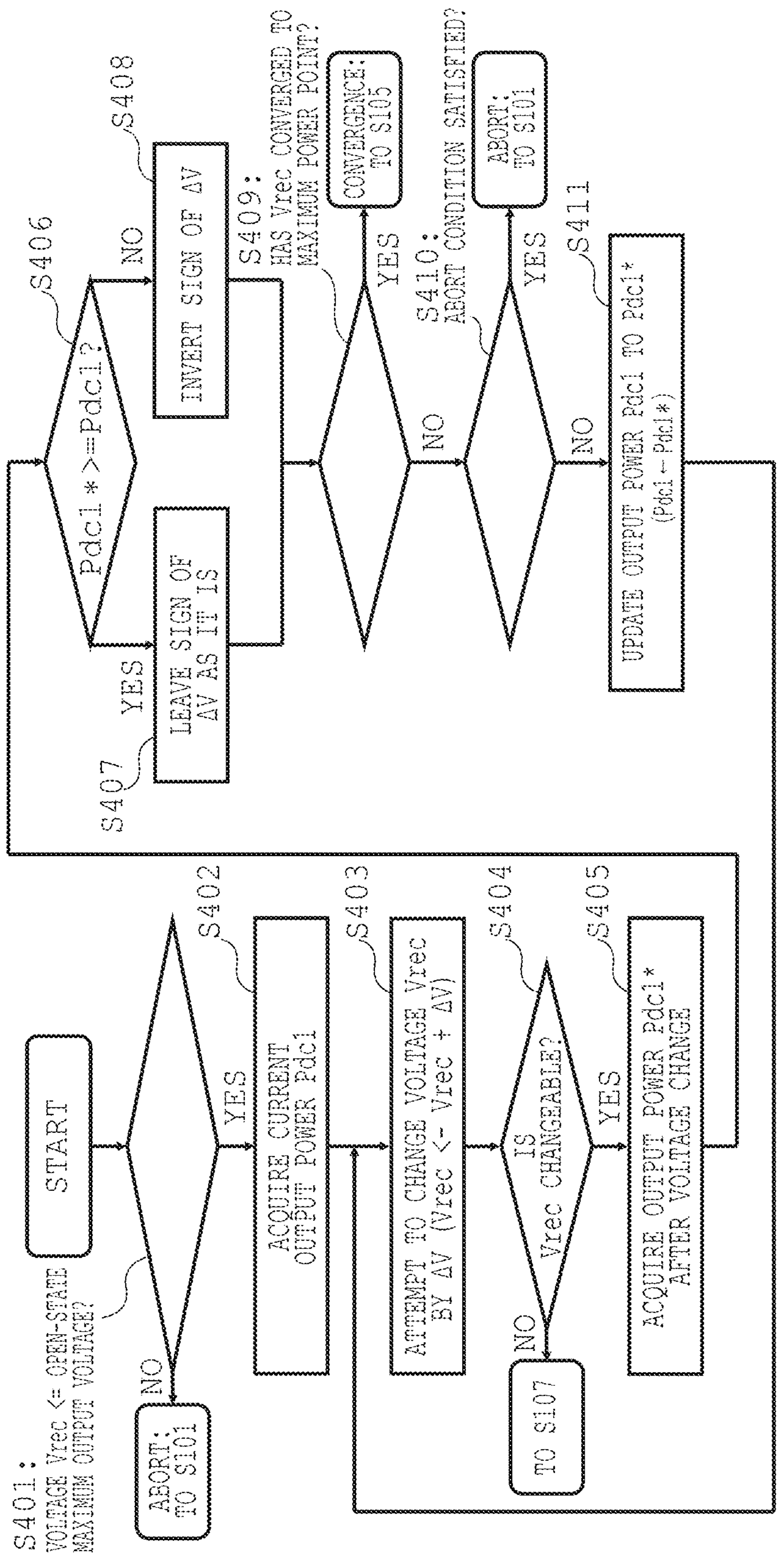
FIG. 7 is a flowchart explaining details of maximum power point control.

FIG. 7 is a flowchart explaining details of maximum power point control in step S104 of FIG. 6. There are various methods for maximum power point control, and a hill climbing method is adopted as an example in the present embodiment 1. The hill climbing method involves searching for the output voltage Vrec that maximizes the output power Pdc1, i.e., for the maximum power point, based on increases and decreases of the output power Pdc1 occurring when the output voltage Vrec of the rectifier is varied as a parameter.

In step S401, the controller 60 determines whether the output voltage Vrec of the target rectifier is equal to or lower than the open-state maximum output voltage of the target rectifier. If the output voltage Vrec is equal to or lower than the open-state maximum output voltage (Yes in S401), the controller 60 goes to the processes of step S402 and subsequent steps. On the other hand, if the output voltage Vrec is higher than the open-state maximum output voltage (No in S401), the controller 60 returns to the process of step S101 in FIG. 6 and selects anew a rectifier with a higher open-state maximum output voltage than the current target rectifier as a target rectifier (S101 to S103). In step S402, the controller 60 acquires current output power Pdc1 of the target rectifier. In step S403, by controlling the step-up/step-down operation of the power converter 40, the controller 60 attempts to change the output voltage Vrec of the target rectifier by a minute amount ΔV. If the output voltage Vrec can be changed by the minute amount ΔV (Yes in S404), the controller 60 acquires output power Pdc1* produced after the output voltage Vrec of the target rectifier changes to Vrec+ΔV (S405). On the other hand, if the output voltage Vrec cannot be changed by the minute amount ΔV (No in S404), the controller 60 goes to the process of step S107 in FIG. 6.

In step S406, the controller 60 determines whether the output power Pdc1* after the voltage change is equal to or higher than the output power Pdc1 before the voltage change. If Pdc1*≥Pdc1 (Yes in S406), the controller 60 leaves the sign of the minute amount ΔV as it is (S407). On the other hand, if Pdc1*<Pdc1 (No in S406), the controller 60 inverts the sign of the minute amount ΔV (S408).

In step S409, by checking whether the following conditional expression is satisfied, the controller 60 determines whether the output voltage Vrec of the target rectifier has converged to the maximum power point.

$$|Pdc1*-Pdc1|<\varepsilon$$

In the above expression, "ε" is a threshold (predetermined value) for use to determine convergence.

If the output voltage Vrec of the target rectifier has converged to the maximum power point (Yes in S409), the controller 60 goes to the process of step S105 in FIG. 6. On the other hand, if the output voltage Vrec of the target rectifier has not converged to the maximum power point (No in S409), the controller 60 determines whether an abort condition for maximum power point control is satisfied (S410).

Specifically, the controller 60 checks whether the output power Pdc1* of the target rectifier is higher than maximum output power and whether the output voltage Vrec of the target rectifier is higher than the open-state maximum output voltage. If at least one of these conditions is satisfied, the controller 60 determines that the abort condition for maximum power point has been satisfied. Note that the maximum output power is the maximum power the target rectifier can output stably while the open-state maximum output voltage is the maximum voltage the target rectifier can output stably.

If the controller 60 determines that the abort condition for maximum power point control has been satisfied (Yes in S410), the controller 60 aborts the maximum power point control to protect the target rectifier and goes to the process of step S101 in FIG. 6. On the other hand, if the abort condition for maximum power point control has not been satisfied (No in S410), the controller 60 updates the current output power Pdc1 to Pdc1* (S411) and returns to the process of step S403.

In step S105 of FIG. 6, the controller 60 determines whether the output power Pdc1 of the current target rectifier is equal to or lower than the maximum output power of the target rectifier.

If the output power Pdc1 of the current target rectifier is equal to or lower than the maximum output power of the target rectifier (Yes in S105), the controller 60 goes to the process of step S106 in FIG. 6. On the other hand, if the output power Pdc1 of the current target rectifier is higher than the maximum output power of the target rectifier (No in S105), the controller 60 returns to the process of step S101 and selects a target rectifier anew by selecting a rectifier higher in maximum output power than the current target rectifier (S101 to S103).

In step S106, the controller 60 estimates the current received RF power Prf. In so doing, since the output voltage Vrec of the target rectifier has converged to the maximum power point (Yes in S409) and the output power Pdc1 of the current target rectifier is equal to or lower than the maximum output power of the target rectifier (Yes in S105), the received RF power Prf can be estimated from the output voltage Vrec or output power Pdc1 of the target rectifier.

Specifically, regarding the rectifiers 22*a* to 22*c* included in the switching rectifier circuit 20, the controller 60 stores relationships between input power and output voltage or output power at the time of convergence to the maximum power point. With reference to these relationships, the controller 60 estimates the current received RF power Prf from the output voltage Vrec or output power Pdc1 of the currently selected target rectifier. Because there is no need for procedures for switching among the rectifiers and acquiring open-circuit voltages, the time required for this estimation is far shorter than the process of step S101 that involves estimating the current received RF power Prf by selecting the rectifiers in sequence.

When the current received RF power Prf has been estimated, as a target rectifier, the controller 60 selects anew the rectifier, the maximum input power of which is equal to or higher than the current received RF power Prf, and which provides the highest power conversion efficiency at the current received RF power Prf (S103). Consequently, if fluctuations in the received RF power Prf are relatively small, optimum rectifiers can be selected as target rectifiers by tracking the fluctuations at high speed.

In step S107, the controller 60 determines whether the current received RF power Prf is equal to or higher than minimum power (minimum input power) at which the target rectifier can operate stably. Specifically, when the received RF power Prf fluctuates and falls to or below the minimum input power of the target rectifier, the output power Pdc1 of the target rectifier becomes lower than minimum power (minimum output power) the target rectifier can output stably. Although the output power Pdc1 and output voltage Vrec of the target rectifier fluctuate depending on an output load condition of the target rectifier, when the output load condition is light load, the output voltage Vrec tends to more closely reflect the received RF power Prf than does the output power Pdc1.

Using this property, by checking whether the output voltage Vrec of the target rectifier is equal to or higher than a minimum output voltage of the target rectifier, the controller 60 determines whether the current received RF power Prf is equal to or higher than the minimum input power of the target rectifier. Note that when the current received RF power Prf is lower than the minimum input power of a rectifier, the output power Pdc1 of the rectifier becomes lower than the minimum output power as well. Therefore, the controller 60 may determine whether the current received RF power Prf is equal to or higher than the minimum input power of the target rectifier by checking the output power Pdc1 instead of the output voltage Vrec. However, because of the ease of distinction from a light-load condition described later, it is more preferable to check the output voltage Vrec of the target rectifier in step S107.

If the current received RF power Prf is lower than the minimum input power of the target rectifier (No in S107), the controller 60 returns to the process of step S101 and selects a target rectifier anew by selecting a rectifier lower in minimum input power than the current received RF power Prf (S101 to S103). On the other hand, if the current received RF power Prf is equal to or higher than the minimum input power of the currently selected target rectifier (Yes in S107), the controller 60 goes to the processes of steps S108 and S109.

In steps S108 and S109, a light-load condition and a transition from normal mode to light-load mode are checked for. If the output power Pdc2 of the power converter 40 is higher than the power required by the external load 80, even though the charge level of the storage battery 50 is near the upper limit, the power converter 40 becomes unable to output the output power Pdc2 corresponding in magnitude to the output power Pdc1 of the target rectifier at the time of convergence to the maximum power point. This state is referred to as a light-load condition. According to Embodiment 1, if such a light-load condition is detected, a transition from normal mode to light-load mode takes place and the power reception apparatus 100 remains on standby in light-load mode until the light-load condition is resolved. Once the light-load condition is resolved, the power reception apparatus 100 returns to normal mode from light-load mode. Specifically, processes such as described below are carried out.

In step S108, the controller 60 determines whether the power reception apparatus 100 is already in light-load mode at present. If the power reception apparatus 100 is already in light-load mode at present (Yes in S108), the controller 60 returns to the process of step S103. Consequently, the light-load condition is maintained and the processes of steps S103 and S104 and steps S107 and S108 are repeated until the output voltage Vrec of the target rectifier converges to the maximum power point. Subsequently when the light-load condition is resolved and the output voltage Vrec of the target rectifier converges to the maximum power point (Yes in S409), the power reception apparatus 100 automatically returns to normal mode from light-load mode, and the processes of step S105 and subsequent steps are carried out.

On the other hand, if the current mode is not the light-load mode (No in S108), the controller 60 determines whether to enter the light-load mode (S109). Specifically, the controller 60 estimates the current received RF power Prf using a method similar to the method in steps S101 to S103, and selects a target rectifier anew according to the received RF power Prf. If the newly selected target rectifier is the same as the previous one, the controller 60 determines that the reason for aborting the maximum power point control is a light-load condition rather than a fluctuation in the received RF power Prf, and newly enters the light-load mode (Yes in S109). On the other hand, if the newly selected target rectifier is different from the previous one, the controller 60 determines that the reason for aborting the maximum power point control is a fluctuation in the received RF power Prf rather than a light-load condition, and does not enter the light-load mode (No in S109).

As described above, the controller 60 of the power reception apparatus 100 according to Embodiment 1 estimates the received RF power Prf based on the output voltage Vrec or output power Pdc1 of the currently selected target rectifier included in the switching rectifier circuit 20, and on the relationship between the input power and output voltage or output power of the target rectifier. This feature allows the power reception apparatus 100 according to Embodiment 1 to estimate the received RF power Prf during a series of operations including reception of the received RF power Prf, conversion of the received RF power Prf into DC power Pdc2, and output of the DC power Pdc2.

According to the received RF power Prf estimated as described above, the controller 60 selects any one of the rectifiers 22*a* to 22*c* included in the switching rectifier circuit, as a target rectifier. Specifically, the controller 60 selects a target rectifier from among the rectifiers 22*a* to 22*c* by selecting the rectifier, the maximum input power of which is equal to or higher than the received RF power Prf, and which provides the highest power conversion efficiency at the received RF power Prf. This makes it possible to always obtain high output power Pdc2 from the received RF power Prf, the magnitude of which fluctuates widely.

Using the power converter 40, the controller 60 controls the output voltage Vrec of the target rectifier such that the output power Pdc1 of the target rectifier will be maximized. This makes it possible to always obtain maximum output power Pdc2 from the received RF power Prf, the magnitude of which fluctuates widely.

If the output voltage Vrec of the target rectifier has converged to the maximum power point, and if the output power Pdc1 of the current target rectifier is equal to or lower than the maximum output power of the target rectifier (Yes in S105), the controller 60 estimates the received RF power Prf using the relationship between the input power and output voltage or output power of the target rectifier at the time of convergence to the maximum power point. Consequently, when fluctuations in the received RF power Prf are relatively small, the received RF power Prf can be estimated more quickly than can the method described next.

In cases other than the one described above, i.e., if maximum power point control is aborted due to fluctuations or the like of the received RF power Prf (No in S107 or No in S109) or if the output power Pdc1 of the target rectifier is higher than the maximum output power even though the output voltage Vrec has converged to the maximum power point (No in S105), with the input impedance of the power converter 40 fixed to infinity (open), the controller 60 selects the rectifiers 22*a* to 22*c* included in the switching rectifier circuit 20 in descending order of maximum input power and estimates the received RF power Prf using the relationship between input power and output voltage when the output of the rectifier is open. This prevents breakdown of the rectifier due to input of power in excess of the maximum input power even if the magnitude of the received RF power Prf is unknown.

Embodiment 2

Figure 8:
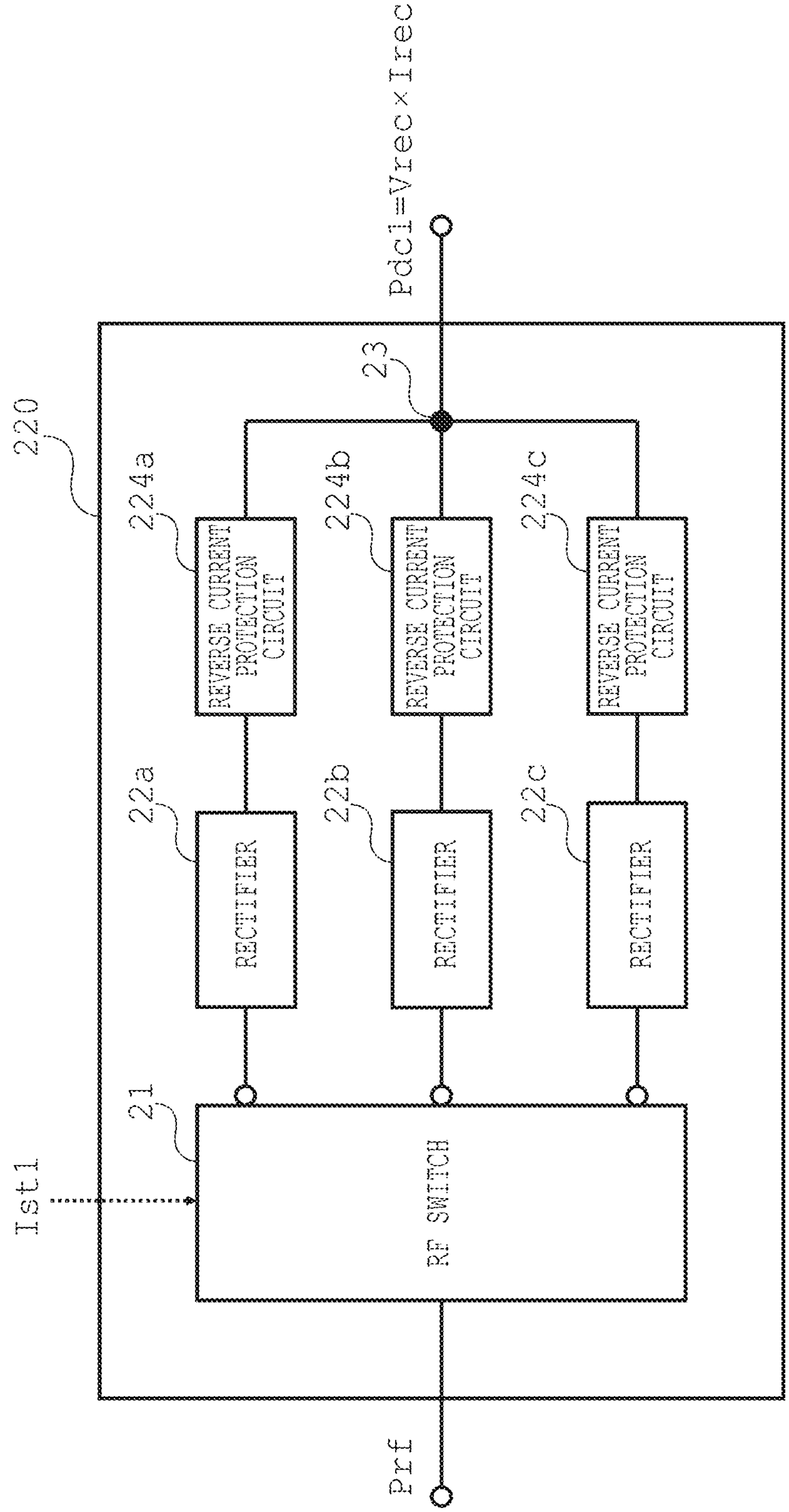
FIG. 8 is a diagram showing a detailed configuration of a switching rectifier circuit according to Embodiment 2.

FIG. 8 is a diagram showing a detailed configuration of a switching rectifier circuit 220 of a power reception apparatus according to Embodiment 2. In the switching rectifier circuit 220, reverse current protectors 224*a* to 224*c* are added between outputs of the respective rectifiers 22*a* to 22*c* and the node 23. Note that components other than the switching rectifier circuit 220 are the same as the power reception apparatus 100 according to Embodiment 1.

In the switching rectifier circuit 20 according to Embodiment 1, the outputs of the respective rectifiers 22*a* to 22*c* are always connected to the node 23. Therefore, the output current of the currently selected target rectifier might flow back to other, non-selected rectifiers through the node 23, damaging the rectifiers. With the switching rectifier circuit 220 according to Embodiment 2, since the reverse current protectors 224*a* to 224*c* are provided between outputs of the respective rectifiers 22*a* to 22*c* and the node 23, backflow of output current from the node 23 to the rectifiers 22*a* to 22*c* is prevented.

As an example, the reverse current protectors 224*a* to 224*c* may be DC switches configured to cut off connections between the outputs of the currently non-selected rectifiers and the node 23 with reference to the command signal Ist1 inputted to the RF switch 21 from the controller 60. Alternatively, each of the reverse current protectors 224*a* to 224*c* may be a cutoff circuit configured to cut off the connection between the rectifier it is connected to and the node upon detecting a condition in which the output voltage of the rectifier is lower than the voltage of the node 23.

Embodiment 3

Figure 9:
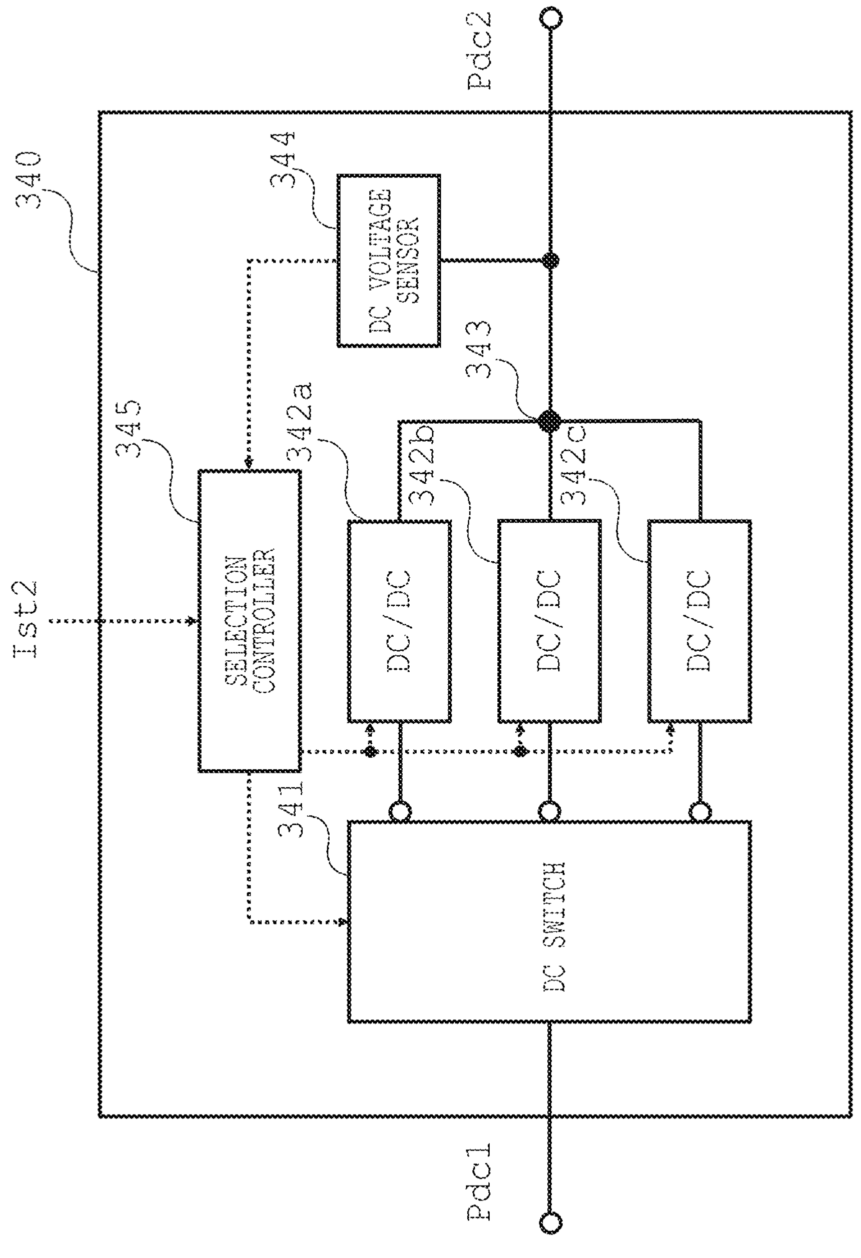
FIG. 9 is a diagram showing a detailed configuration of a power converter according to Embodiment 3.

FIG. 9 is a diagram showing a detailed configuration of a power converter 340 according to Embodiment 3. The power converter 340 includes a DC switch 341 (second switch), three DC-DC converter circuits 342*a* to 342*c* (power converter circuits) differing from one another in at least one of circuit configuration and circuit constant, a DC voltage sensor 344 (voltage detector), and a selection controller 345. However, the number of DC-DC converter circuits is not limited to three, and it is sufficient if there are two or more DC-DC converter circuits. Components other than the power converter 340 are the same as the power reception apparatus 100 according to Embodiment 1.

The DC switch 341 connects input of the power converter 340 with input of any one of the DC-DC converter circuits selected by the selection controller 345. Outputs of the respective DC-DC converter circuits 342*a* to 342*c* are connected together at a node 343 (second combiner) to form a single output of the power converter 340. The DC voltage sensor 344 detects output voltage of the power converter 340.

The selection controller 345 is made up of a microcomputer, an FPGA, an ASIC, or the like. The selection controller 345 selects the DC-DC converter circuit with the highest power conversion efficiency from among the DC-DC converter circuits 342*a* to 342*c* based on the relationship between the output voltage Vrec of the currently selected target rectifier and the output voltage of the power converter 340, where the relationship is contained in the command signal Ist2 from the controller 60. The selection controller 345 controls the operation of the selected DC-DC converter circuit by following the command signal Ist2 from the controller 60.

Generally, the power conversion efficiency of a DC-DC converter circuit depends on the circuit configuration and the circuit constant. For example, a DC-DC converter circuit specializing in either step-up or step-down is higher in power conversion efficiency than a DC-DC converter circuit capable of both step-up and step-down. Besides, the input voltage of the DC-DC converter circuit, i.e., the output voltage Vrec of the target rectifier, fluctuates with maximum power point control. On the other hand, the output voltage of the DC-DC converter circuit, i.e., the output voltage of the power converter 40, is fixed to the closed-circuit voltage (CCV) of the storage battery 50, which depends on the charge level of the storage battery 50.

According to Embodiment 3, from among the plurality of DC-DC converter circuits 342*a* to 342*c* differing from one another in at least one of circuit configuration and circuit constant, the DC-DC converter circuit with the highest power conversion efficiency is selected depending on a relationship between input voltage and output voltage of the power converter 340. Consequently, high power conversion efficiency is available under various circumstances. The power conversion efficiency of the DC-DC converter circuit also depends on input power. Therefore, the selection controller 345 may select the DC-DC converter circuit considering the output power Pdc1 of the target rectifier in addition to the relationship between input voltage and output voltage.

Embodiment 4

Figure 10:
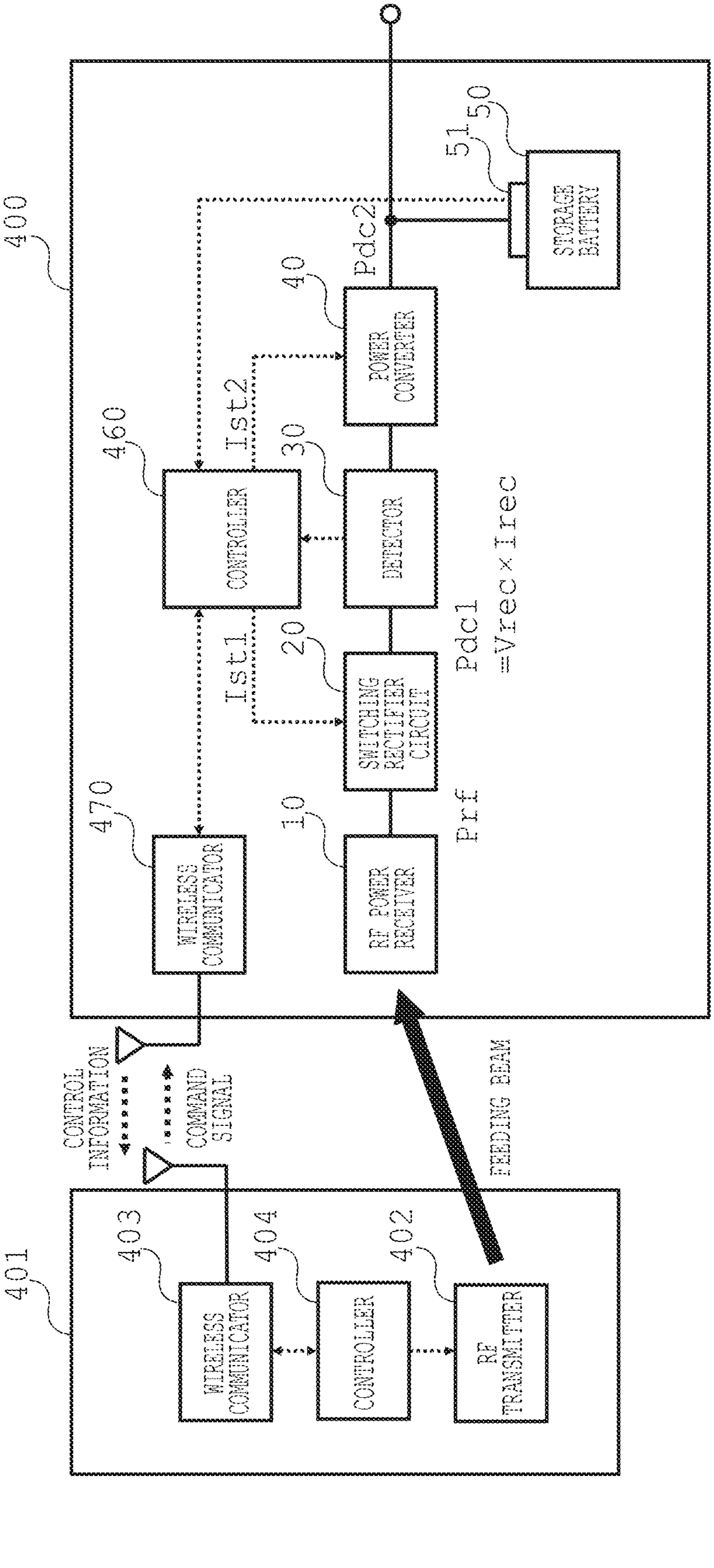
FIG. 10 is a diagram showing a configuration of a wireless power feed system according to Embodiment 4.

FIG. 10 is a diagram showing a configuration of a wireless power feed system according to Embodiment 4. The wireless power feed system includes one or more power transmission apparatus 401 and one or more power reception apparatus 400. However, only one power transmission apparatus 401 and one power reception apparatus 400 are shown in FIG. 10.

The power transmission apparatus 401 includes a power transmitter 402 configured to transmit a feeding beam, a wireless communicator 403 configured to transmit and receive wireless signals to/from the power reception apparatus 400, and a controller 404 (second controller) configured to control operations of the power transmitter 402 and wireless communicator 403. The power reception apparatus 400 includes a wireless communicator 470 (first wireless communicator) configured to transmit and receive wireless signals to/from the power transmission apparatus 401 in addition to the components of the power reception apparatus 100 according to Embodiment 1. A controller 460 (first controller) of the power reception apparatus 400 controls operation of the wireless communicator 470 in addition to the switching rectifier circuit 20 and the power converter 40.

Preferably the frequency used for wireless communication between the power transmission apparatus 401 and the power reception apparatus 400 is different from the frequency of the feeding beam, but the use of the same frequency or adjacent frequencies is not excluded. The frequency used for wireless communication may be compliant with general wireless communication standards.

The wireless communicator 470 of the power reception apparatus 400 wirelessly transmits control information to the power transmission apparatus 401. The control information includes at least one of the received RF power Prf, the output power Pdc1 of the currently selected target rectifier, the output voltage Vrec of the target rectifier, the output current Irec of the target rectifier, the output power Pdc2 of the power converter 40, the electric power involved in charging and discharging of the storage battery 50, the charge level of the storage battery 50, and the command signals Ist1 and Ist2.

The controller 404 of the power transmission apparatus 401 receives control information from the power reception apparatus 400 via the wireless communicator 403. Then, based on the received control information the controller 404 controls start and end of power feed to the power reception apparatus 400, the magnitude and direction of the feeding beam, and the like. If control information is received from a plurality of power reception apparatus, by adjusting allocations of power feed time to each of the power reception apparatus based on the received multiple sets of control information, the controller 404 of the power transmission apparatus 401 can optimize the entire wireless power feed system.

Part of the functions handled by the controller 460 of the power reception apparatus 400 may be handled by the controller 404 of the power transmission apparatus 401. For example, estimation of the received RF power Prf, selection of a target rectifier, computations for maximum power point control, and the like may be carried out on the side of the power transmission apparatus 401 based on the control information received from the power reception apparatus 400, and the power reception apparatus 400 may be remotely controlled by wirelessly transmitting command signals to the power reception apparatus 400 from the power transmission apparatus 401.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments of the present invention can also be configured as follows.

CLAUSES

Clause 1. (Embodiment 1)

A power reception apparatus comprising:
- a power receiver configured to receive wireless power;
- a switching rectifier circuit including a plurality of rectifiers having different power conversion characteristics and configured to rectify received power using a target rectifier selected from among the plurality of rectifiers;
- a detector configured to detect output voltage or output power of the target rectifier;
- a power converter configured to control the output voltage of the target rectifier;
- a storage battery configured to be charged with or discharge output power of the power converter; and
- a controller configured to
  - estimate the received power based on (i) the output voltage of the target rectifier and information indicating a relationship between input power and the output voltage of the target rectifier, or (ii) the output power of the target rectifier and information indicating a relationship between the input power and the output power of the target rectifier, and
  - control operations of the switching rectifier circuit and the power converter based on the estimated received power.

Clause 2. (Embodiment 1)

The power reception apparatus according to clause 1, wherein the controller selects one of the plurality of rectifiers as the target rectifier in accordance with the received power.

Clause 3. (embodiment 1)

The power reception apparatus according to clause 2, wherein the controller selects, as the target rectifier, a rectifier from among the plurality of rectifiers whose the maximum input power is equal to or higher than the received power and which provides maximum power conversion efficiency at the received power.

Clause 4. (embodiment 1)

The power reception apparatus according to one of clauses 1 to 3, wherein by controlling step-up/step-down operation of the power converter, the controller controls step-up/step-down operation of the power converter to control the output voltage of the target rectifier so as to maximize the output power of the target rectifier.

Clause 5. (embodiment 1)

The power reception apparatus according to clause 4, wherein when the output voltage of the target rectifier converges to a maximum power point and the output power of the target rectifier is equal to or lower than maximum output power of the target rectifier, the controller estimates the received power using information indicating a relationship between the input power and the output voltage of the target rectifier or between the input power and the output power of the target rectifier at the time of convergence to the maximum power point.

Clause 6. (Embodiment 1)

The power reception apparatus according to one of clauses 1 to 5, wherein in open-circuit condition in which no input current flow into the power converter, the controller selects the plurality of rectifiers in descending order of maximum input power and estimates the received power using information indicating a relationship between input power and output voltage when outputs of the plurality of rectifiers are open.

Clause 7. (Embodiment 1)

The power reception apparatus according to clause 1, further comprising a calculator configured to measure electric power charged into and discharged from the storage battery and calculate a charge level of the storage battery based on the measured electric power.

Clause 8. (Embodiment 1)

The power reception apparatus according to one of clauses 1 to 7, wherein:

- the switching rectifier circuit includes:
  - a first switch configured to connect input of the switching rectifier circuit with an input of one of the plurality of rectifiers, and
  - a first combiner connected to outputs of all the plurality of rectifiers and to output of the switching rectifier circuit; and
- the controller controls the first switch to select one of the plurality of rectifiers as the target rectifier.

Clause 9. (Embodiment 2)

The power reception apparatus according to clause 8, wherein the switching rectifier circuit further includes a plurality of reverse current protectors respectively provided between the outputs of the plurality of rectifiers and the first combiner.

Clause 10. (Embodiment 3)

The power reception apparatus according to clause 1, wherein:

- the power converter includes:
  - a plurality of power converter circuits differing in at least one of circuit configuration and circuit constant,
  - a second switch configured to connect input of the power converter with an input of one of the plurality of power converter circuits,
  - a second combiner connected to outputs of all the plurality of power converter circuits and to output of the power converter,
  - a voltage detector configured to detect output voltage of the power converter, and
  - a selection controller configured to control the second switch to select one of the plurality of power converter circuits; and
- the selection controller selects a power converter circuit with the highest power conversion efficiency from among the plurality of power converter circuits based on a relationship between the output voltage of the target rectifier and the output voltage of the power converter.

Clause 11. (Embodiment 4)

The power reception apparatus according to clause 1, further comprising a wireless communicator configured to wirelessly transmit control information, including an operating state of the power reception apparatus, to a power transmission apparatus configured to transmit the wireless power.

Clause 12. (Embodiment 4)

The power reception apparatus according to clause 11, wherein the control information includes at least one of:

- an estimated value of the received power;
- the output power of the target rectifier;
- the output voltage of the target rectifier;
- an output current of the target rectifier;
- the output power of the power converter;
- information for controlling the switching rectifier circuit, inputted to the switching rectifier circuit from the controller; and
- information for controlling the power converter, inputted to the power converter from the controller.

Clause 13. (Embodiment 4)

The power reception apparatus according to clause 12, further comprising a calculator configured to measure electric power charged into or discharged from the storage battery and calculate a charge level of the storage battery based on the measured electric power, wherein

- the control information further includes at least one of the measured electric power and the charge level of the storage battery.

Clause 14. (Embodiment 1)

A wireless power reception method, comprising:

- receiving wireless power;
- rectifying received power using a target rectifier selected from among a plurality of rectifiers differing in power conversion characteristics;

detecting output voltage or output power of the target rectifier;

estimating the received power based on (i) the output voltage of the target rectifier and information indicating a relationship between input power and the output voltage of the target rectifier or (ii) the output power of the target rectifier and information indicating a relationship between the input power and the output power of the target rectifier; and selecting the target rectifier based on the estimated received power.

Clause 15. (Embodiment 4)

A wireless power feed system comprising:

a power transmission apparatus configured to transmit wireless power; and a power reception apparatus configured to receive the wireless power, wherein the power reception apparatus includes:

a power receiver configured to receive the wireless power, a switching rectifier circuit including a plurality of rectifiers differing in power conversion characteristics and configured to rectify received power using a target rectifier selected from among the plurality of rectifiers, a detector configured to detect output voltage or output power of the target rectifier, a power converter configured to control the output voltage of the target rectifier, a storage battery configured to be charged with or discharge output power of the power converter, and a first controller configured to estimate the received power based on (i) the output voltage of the target rectifier and information indicating a relationship between input power and the output voltage of the target rectifier or (ii) the output power of the target rectifier and on information indicating a relationship between the input power and the output power of the target rectifier, and to control operations of the switching rectifier circuit and the power converter based on the estimated received power.

Clause 16. (Embodiment 4)

The wireless power feed system according to clause 15, wherein:

the power reception apparatus further includes a first wireless communicator configured to transmit and receive wireless signals;

the first controller controls operation of the first wireless communicator;

the power transmission apparatus includes:

a power transmitter configured to transmit the wireless power, a second wireless communicator configured to transmit and receive wireless signals, and a second controller configured to control operations of the power transmitter and the second wireless communicator;

the first wireless communicator of the power reception apparatus wirelessly transmits control information indicating an operating state of the power reception apparatus to the power transmission apparatus; and the second controller of the power transmission apparatus controls the power transmitter based on the control information.

Clause 17. (Embodiment 4)

The wireless power feed system according to clause 16, wherein the second controller of the power transmission apparatus generates information for controlling the switching rectifier circuit and the power converter based on the control information received from the power reception apparatus, wirelessly transmits a command signal including the generated information to the power reception apparatus, and thereby remotely controls the power reception apparatus.

The invention claimed is:

1. A power reception apparatus comprising:

a power receiver configured to receive wireless power;

a switching rectifier circuit including a plurality of rectifiers having different power conversion characteristics and configured to rectify received power using a target rectifier selected from among the plurality of rectifiers;

a detector configured to detect output voltage or output power of the target rectifier;

a power converter configured to control the output voltage of the target rectifier;

a storage battery configured to be charged with or discharge output power of the power converter; and a controller configured to estimate the received power based on (i) the output voltage of the target rectifier and information indicating a relationship between input power and the output voltage of the target rectifier, or (ii) the output power of the target rectifier and information indicating a relationship between the input power and the output power of the target rectifier, and control operations of the switching rectifier circuit and the power converter based on the estimated received power.

2. The power reception apparatus according to claim 1, wherein the controller selects one of the plurality of rectifiers as the target rectifier in accordance with the received power.

3. The power reception apparatus according to claim 2, wherein the controller selects, as the target rectifier, a rectifier from among the plurality of rectifiers whose the maximum input power is equal to or higher than the received power and which provides maximum power conversion efficiency at the received power.

4. The power reception apparatus according to claim 1, wherein by controlling step-up/step-down operation of the power converter, the controller controls step-up/step-down operation of the power converter to control the output voltage of the target rectifier so as to maximize the output power of the target rectifier.

5. The power reception apparatus according to claim 4, wherein when the output voltage of the target rectifier converges to a maximum power point and the output power of the target rectifier is equal to or lower than maximum output power of the target rectifier, the controller estimates the received power using information indicating a relationship between the input power and the output voltage of the target rectifier or between the input power and the output power of the target rectifier at the time of convergence to the maximum power point.

6. The power reception apparatus according to claim 1, wherein in open-circuit condition in which no input current flow into the power converter, the controller selects the plurality of rectifiers in descending order of maximum input power and estimates the received power using information indicating a relationship between input power and output voltage when outputs of the plurality of rectifiers are open.

7. The power reception apparatus according to claim 1, further comprising a calculator configured to measure electric power charged into and discharged from the storage battery and calculate a charge level of the storage battery based on the measured electric power.

8. The power reception apparatus according to claim 1, wherein:

the switching rectifier circuit includes:

a first switch configured to connect input of the switching rectifier circuit with an input of one of the plurality of rectifiers, and a first combiner connected to outputs of all the plurality of rectifiers and to output of the switching rectifier circuit; and the controller controls the first switch to select one of the plurality of rectifiers as the target rectifier.

9. The power reception apparatus according to claim 8, wherein the switching rectifier circuit further includes a plurality of reverse current protectors respectively provided between the outputs of the plurality of rectifiers and the first combiner.

10. The power reception apparatus according to claim 1, wherein:

the power converter includes:

a plurality of power converter circuits differing in at least one of circuit configuration and circuit constant, a second switch configured to connect input of the power converter with an input of one of the plurality of power converter circuits, a second combiner connected to outputs of all the plurality of power converter circuits and to output of the power converter, a voltage detector configured to detect output voltage of the power converter, and a selection controller configured to control the second switch to select one of the plurality of power converter circuits; and the selection controller selects a power converter circuit with the highest power conversion efficiency from among the plurality of power converter circuits based on a relationship between the output voltage of the target rectifier and the output voltage of the power converter.

11. The power reception apparatus according to claim 1, further comprising a wireless communicator configured to wirelessly transmit control information, including an operating state of the power reception apparatus, to a power transmission apparatus configured to transmit the wireless power.

12. The power reception apparatus according to claim 11, wherein the control information includes at least one of:

an estimated value of the received power;

the output power of the target rectifier;

the output voltage of the target rectifier;

an output current of the target rectifier;

the output power of the power converter;

information for controlling the switching rectifier circuit, inputted to the switching rectifier circuit from the controller; and information for controlling the power converter, inputted to the power converter from the controller.

13. The power reception apparatus according to claim 12, further comprising a calculator configured to measure electric power charged into or discharged from the storage battery and calculate a charge level of the storage battery based on the measured electric power, wherein the control information further includes at least one of the measured electric power and the charge level of the storage battery.

14. A wireless power reception method, comprising:

receiving wireless power;

rectifying received power using a target rectifier selected from among a plurality of rectifiers differing in power conversion characteristics;

detecting output voltage or output power of the target rectifier;

estimating the received power based on (i) the output voltage of the target rectifier and information indicating a relationship between input power and the output voltage of the target rectifier or (ii) the output power of the target rectifier and information indicating a relationship between the input power and the output power of the target rectifier; and selecting the target rectifier based on the estimated received power.

15. A wireless power feed system comprising:

a power transmission apparatus configured to transmit wireless power; and a power reception apparatus configured to receive the wireless power, wherein the power reception apparatus includes:

a power receiver configured to receive the wireless power, a switching rectifier circuit including a plurality of rectifiers differing in power conversion characteristics and configured to rectify received power using a target rectifier selected from among the plurality of rectifiers, a detector configured to detect output voltage or output power of the target rectifier, a power converter configured to control the output voltage of the target rectifier, a storage battery configured to be charged with or discharge output power of the power converter, and a first controller configured to estimate the received power based on (i) the output voltage of the target rectifier and information indicating a relationship between input power and the output voltage of the target rectifier or (ii) the output power of the target rectifier and on information indicating a relationship between the input power and the output power of the target rectifier, and to control operations of the switching rectifier circuit and the power converter based on the estimated received power.

16. The wireless power feed system according to claim 15, wherein:

the power reception apparatus further includes a first wireless communicator configured to transmit and receive wireless signals;

the first controller controls operation of the first wireless communicator;

the power transmission apparatus includes:

a power transmitter configured to transmit the wireless power, a second wireless communicator configured to transmit and receive wireless signals, and a second controller configured to control operations of the power transmitter and the second wireless communicator;

the first wireless communicator of the power reception apparatus wirelessly transmits control information indicating an operating state of the power reception apparatus to the power transmission apparatus; and the second controller of the power transmission apparatus controls the power transmitter based on the control information.

17. The wireless power feed system according to claim 16, wherein the second controller of the power transmission apparatus generates information for controlling the switching rectifier circuit and the power converter based on the control information received from the power reception apparatus, wirelessly transmits a command signal including the generated information to the power reception apparatus, and thereby remotely controls the power reception apparatus.

* * * * *